United States Patent
Lin (10) Patent No.: US 11,144,168 B1
(45) Date of Patent: Oct. 12, 2021

(54) TOUCH PANEL AND MANUFACTURING METHOD THEREOF

(71) Applicant: HannsTouch Solution Incorporated, Tainan (TW)

(72) Inventor: Sheng-Chia Lin, Tainan (TW)

(73) Assignee: HannsTouch Solution Incorporated, Tainan (TW)

( * ) Notice: Subject to any disclaimer, the term of this patent is extended or adjusted under 35 U.S.C. 154(b) by 0 days.

(21) Appl. No.: 16/907,140

(22) Filed: Jun. 19, 2020

(51) Int. Cl.
*G06F 3/044* (2006.01)

(52) U.S. Cl.
CPC .. *G06F 3/0448* (2019.05); *G06F 2203/04103* (2013.01); *G06F 2203/04107* (2013.01); *G06F 2203/04112* (2013.01)

(58) Field of Classification Search
CPC ......... G06F 3/0448; G06F 2203/04103; G06F 2203/04107; G06F 2203/04112
USPC ....................................................... 345/173
See application file for complete search history.

(56) References Cited

U.S. PATENT DOCUMENTS

| | | | |
|---|---|---|---|
| 2005/0168618 A1* | 8/2005 | Okita | H01L 27/14603 348/335 |
| 2017/0277320 A1* | 9/2017 | Choi | G06F 3/0446 |
| 2020/0150807 A1* | 5/2020 | Miyashita | G06F 3/04164 |

FOREIGN PATENT DOCUMENTS

CN 104063081 A * 9/2014

* cited by examiner

*Primary Examiner* — Mark Edwards
(74) *Attorney, Agent, or Firm* — Winston Hsu (57) ABSTRACT

A touch panel and a manufacturing method thereof are provided. The touch panel has a touch region and a trace region and includes a substrate, a touch device, a shielding trace, and a plurality of conductive traces. The touch device is disposed on the substrate in the touch region and includes a plurality of electrode pads. The shielding trace and the conductive traces are disposed on the substrate in the trace region. At least a part of the conductive traces is electrically connected to the touch device. The shielding trace includes a first trace layer and a second trace layer electrically connected to each other. The shielding trace is disposed between two of the conductive traces, the first trace layer at least partially overlaps the second trace layer, and the shielding trace doesn't overlap the conductive traces.

14 Claims, 8 Drawing Sheets

TOUCH PANEL AND MANUFACTURING METHOD THEREOF

BACKGROUND OF THE INVENTION

1. Field of the Invention

The present invention relates to a touch panel and a manufacturing method thereof, more particularly to a touch panel with a shielding trace for reducing signal interference.

2. Description of the Prior Art

Since the touch panel provides the user with the human-machine interaction experience when using the display device, it has gradually become an input device for various electronic products, such as smart phones, tablet computers, and smart refrigerators. In a common capacitive touch panel, multiple sensing electrodes are provided to sense the touching of the user, and the sensing electrodes are made of indium tin oxide (ITO) to prevent the images watched by the user from being affected. Since the resistance of ITO is higher than that of metal, non-transparent metal traces are used for connecting the sensing electrodes to pads used as an external output/input terminal in the conventional touch panel. However, with the development of touch technology, the region for disposing the non-transparent metal traces is gradually narrowed, so that capacitive coupling between the metal traces for transmitting the driving signals and the metal traces for transmitting the receiving signals is increased, resulting in the signal interference between them which reduces touch accuracy.

SUMMARY OF THE INVENTION

An embodiment of the present invention provides a touch panel having a touch region and a trace region disposed at least on one side of the touch region. The touch panel includes a substrate, a touch device, a first shielding trace and a plurality of conductive traces. The touch device is disposed on a top surface of the substrate in the touch region, and the touch device includes a plurality of electrode pads. The first shielding trace is disposed on the top surface of the substrate in the trace region and insulated from the touch device. The first shielding trace includes a first trace layer and a second trace layer electrically connected to each other, and in a direction perpendicular to the top surface of the substrate, the first trace layer at least partially overlaps the second trace layer. The conductive traces are disposed on the top surface of the substrate in the trace region, and at least a part of the conductive traces is electrically connected to the touch device. The first shielding trace is disposed between two of the conductive traces, and in the direction, the first shielding trace doesn't overlap the conductive traces.

Another embodiment of the present invention provides a touch panel having a touch region and a trace region disposed at least on one side of the touch region. The touch panel includes a substrate, a touch device and a first shielding trace. The touch device is disposed on a top surface of the substrate in the touch region, and the touch device includes a plurality of electrode pads. The first shielding trace is disposed on the top surface of the substrate in the trace region and insulated from the touch device, and at least a part of the conductive traces is electrically connected to the touch device. The first shielding trace includes a first trace layer and a second trace layer electrically connected to each other, in a direction perpendicular to the top surface of the substrate, the first trace layer at least partially overlaps the second trace layer, and the second trace layer and the electrode pads are formed of a same transparent conductive pattern layer or a same metal mesh layer.

Another embodiment of the present invention provides a manufacturing method of a touch panel. Firstly, a substrate is provided. Then, a touch device is formed on the substrate in a touch region, and a shielding trace and a plurality of conductive traces are formed on the substrate in a trace region. The shielding trace is disposed between two of the conductive traces. The touch device is insulated from the shielding trace and includes a plurality of electrode pads, and the shielding trace includes a first trace layer and a second trace layer electrically connected to each other. In a direction perpendicular to a top surface of the substrate, the first trace layer at least partially overlaps the second trace layer, and the shielding trace doesn't overlap the conductive traces.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
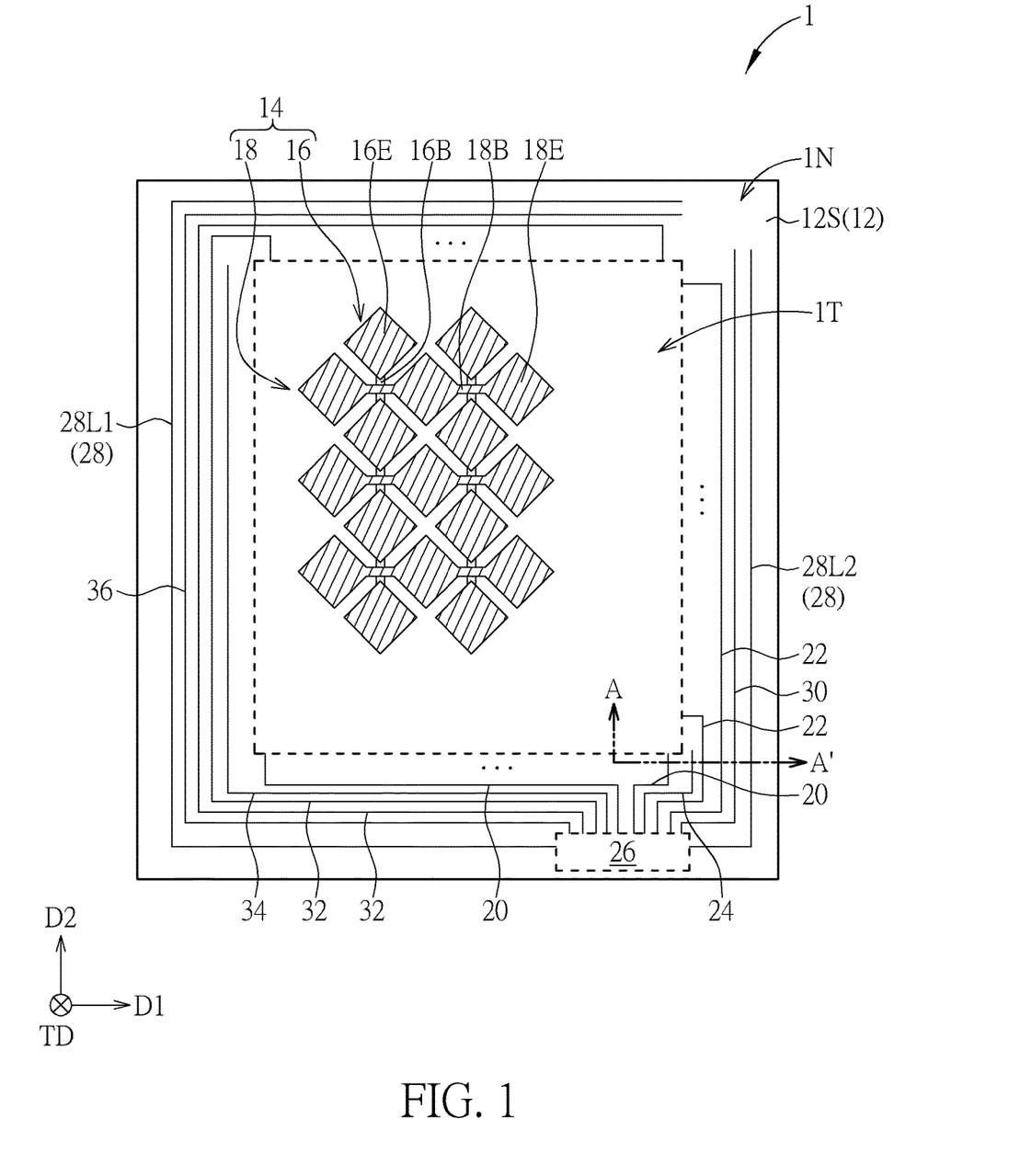
FIG. 1 schematically illustrates a top view of a touch panel according to a first embodiment of the present invention.
Figure 2:
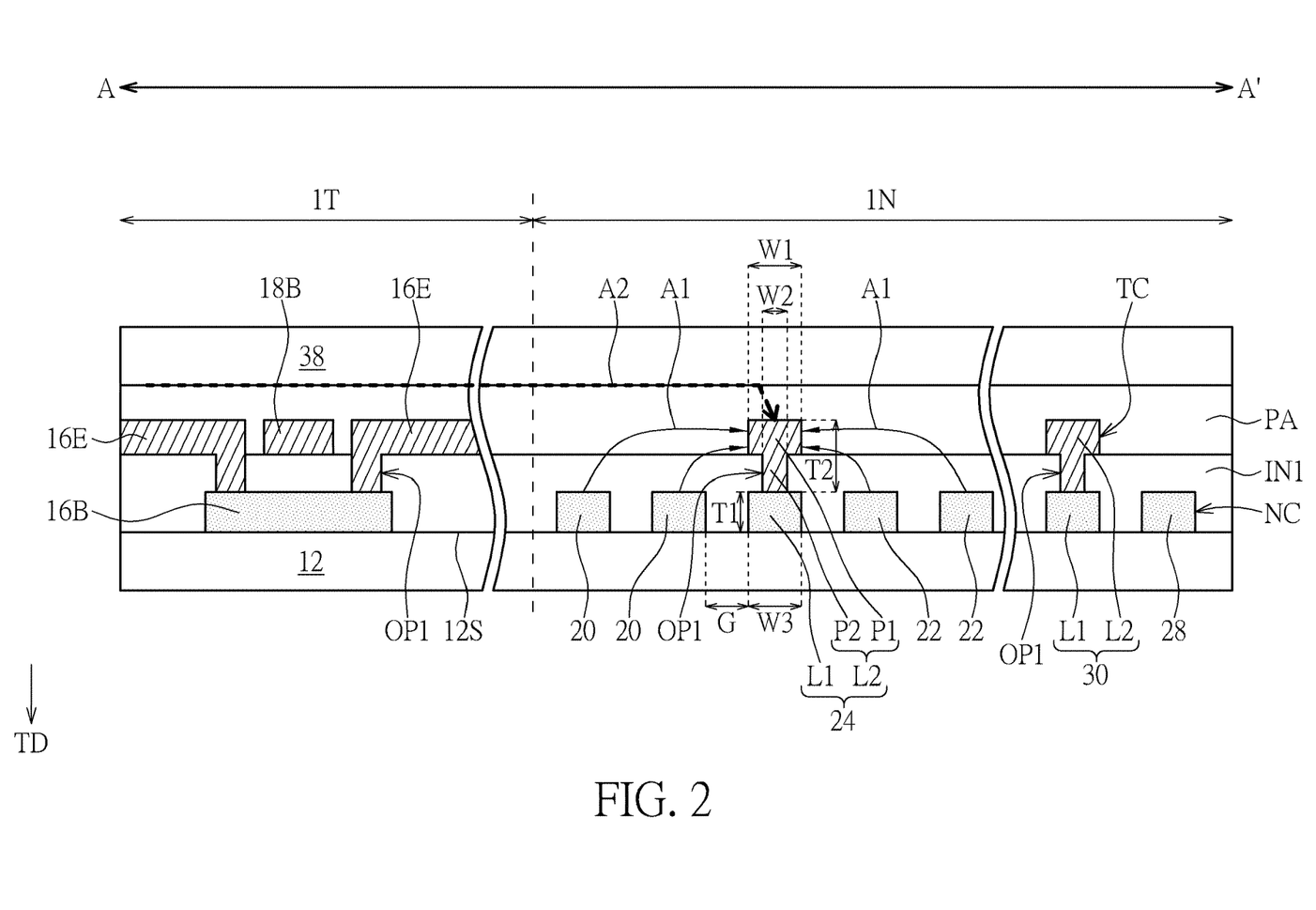
FIG. 2 schematically illustrates a cross-sectional view taken along a line A-A' of FIG. 1.

FIG. 1 schematically illustrates a top view of a touch panel according to a first embodiment of the present invention, and FIG. 2 schematically illustrates a cross-sectional view taken along a line A-A' of FIG. 1. As shown in FIG. 1 and FIG. 2, the touch panel 1 has a touch region 1T and a trace region 1N disposed at least on one side of the touch region 1T. The touch region 1T may be used for disposing following touch device 14 to detect the position of touch object, and the trace region 1N may be used for disposing following traces, but not limited thereto. In this embodiment, the trace region 1N may surround the touch region 1T, but not limited thereto. In some embodiments, the touch panel 1 may be optionally provided with a light shielding layer (not shown) for shielding the traces in the trace region 1N. When the touch panel 1 is applied to a display device, the touch region 1T may correspond to a display region of the display device for displaying images, and the trace region 1N may correspond to a peripheral region of the display device for disposing peripheral device, but not limited thereto. In this embodiment, the touch panel 1 may include a substrate 12, a touch device 14, and a plurality of traces. The substrate 12 may include, for example, a rigid substrate or a flexible substrate. The rigid substrate may for example include glass or other suitable material, but not limited thereto. The flexible substrate may for example include polyimide (PI) or other suitable materials, but not limited thereto.

The touch device 14 is disposed on a top surface 12S of the substrate 12 in the touch region 1T and used for detecting the position where the user approaches or touches the touch panel 1. In this embodiment, the touch device 14 may be a capacitive touch device, but not limited thereto. Specifically, as shown in FIG. 1 and FIG. 2, the touch device 14 may include a plurality of first electrode pads 16E, a plurality of first bridge electrodes 16B, a plurality of second electrode pads 18E, and a plurality of second bridge electrodes 18B. The first bridge electrodes 16B may connect the adjacent first electrode pads 16E arranged in a first direction D1 to each other, so that the first electrode pads 16E and the first bridge electrodes 16B may be serially connected into a plurality of first electrode strings 16 extending along the first direction D1. Also, the second bridge electrodes 18B may connect the adjacent second electrode pads 18E arranged in a second direction D2, so that the second electrode pads 18E and the second bridge electrodes 18B may be serially connected into a plurality of second electrode strings 18 extending along the second direction D2. The first direction D1 and the second direction D2 may respectively be parallel to the top surface 12S of the substrate 12 but not parallel to each other, for example, the first direction D1 may be perpendicular to the second direction D2. The first bridge electrode 16B may cross and be insulated from the corresponding second bridge electrode 18B, such that the first electrode strings 16 may cross the second electrode strings 18 to have the capacitive coupling between the first electrode strings 16 and the second electrode strings 18. Accordingly, the position where the user approaches or touches may be detected. For example, when the touch device 14 is a mutual-capacitance touch device, the first electrode strings 16 may be used for transmitting driving signals, and the second electrode strings 18 may be used for transmitting sensing signals, but not limited thereto. The first electrode strings 16 and the second electrode strings 18 may be interchanged. In this embodiment, the first electrode pads 16E, the second electrode pads 18E, and the second bridge electrodes 18B may be formed of the same transparent conductive pattern layer TC and thus may include the same transparent conductive material. The transparent conductive material may be, for example, ITO, indium zinc oxide (IZO), antimony tin oxide (ATO), aluminum zinc oxide (AZO), graphene, or other suitable materials, but not limited thereto. The first bridge electrodes 16B are formed of the non-transparent conductive pattern layer NC, but not limited thereto. In other embodiments, the first bridge electrodes 16B may also be formed of another transparent conductive pattern layer, i.e. the first bridge electrodes 16B may include the transparent conductive material. The material of the non-transparent conductive pattern layer NC may include metal, metal alloy, or other suitable non-transparent conductive materials. Moreover, the first bridge electrode 16B is disposed between the corresponding second bridge electrode 18B and the substrate 12, but not limited thereto. In some embodiments, the second bridge electrode 18B may be disposed between the corresponding first bridge electrode 16B and the substrate 12 and formed of the non-transparent conductive pattern layer NC, and the first bridge electrodes 16B may be formed of the transparent conductive pattern layer TC. In some embodiments, the capacitive touch device may be different from the above structure, for example, the first electrode strings 16 and the second electrode strings 18 may be strip-shaped. In some embodiments, the touch device 14 may be other types of touch devices, such as a resistive touch device.

As shown in FIG. 1 and FIG. 2, the traces are disposed on the top surface 12S of the substrate 12 in the trace region 1N. The traces may include a plurality of conductive traces and at least one shielding trace. The conductive traces are traces having conductive characteristic other than the shielding trace, and at least a part of the conductive traces is electrically connected to the touch device 14. The conductive traces may for example include metal material or be formed of metal material. For example, the conductive traces may include a plurality of first signal traces 20 and a plurality of second signal traces 22, wherein one end of one of the first signal traces 20 is electrically connected to one end of the corresponding first electrode string 16, and one end of one of the second signal traces 22 is electrically connected to one end of the corresponding second electrode string 18, and the other end of the first signal trace 20 and the other end of the second signal trace 22 may extend into a pad region 26 to be electrically connected to different pads (not shown), thereby being further electrically connected to flexible circuit board, control device or other suitable device through the pads. In this embodiment, the first signal traces 20 and the second signal traces 22 may be formed of the same non-transparent conductive pattern layer NC and therefore may include the same non-transparent conductive material as the first bridge electrodes 16B, but not limited thereto.

The shielding trace may be insulated from the touch device 14 and may be used for reducing signal interference between different conductive traces. In a direction TD perpendicular to the top surface 12S of the substrate 12, the shielding trace may be disposed between any two conductive traces and may not overlap the conductive traces. In this embodiment, the traces may include a shielding trace 24 disposed between the first signal traces 20 and the second signal traces 22 and insulated from the touch device 14. Since the shielding trace 24 may for example be a multi-layer structure, the thickness of the shielding trace 24 is greater than the thicknesses of the first signal traces 20 and the second signal traces 22, so the capacitive coupling doesn't easily penetrate through the shielding trace 24 to be generated between the first signal traces 20 and the second signal traces 22, thereby reducing the signal interference between the first signal traces 20 and the second signal traces 22. In detail, since the driving method of the touch panel 1 may be, for example, to transmit the driving signals on the first electrode strings 16 and to generate the sensing signals on the second electrode strings 18 through the capacitive coupling between the first electrode strings 16 and the second electrode strings 18, so that the capacitive coupling between the first signal traces 20 for transmitting the driving signals and the second signal traces 22 for receiving the sensing signals may easily affect the accuracy of the received sensing signals. Therefore, by disposing the shielding trace 24 between the first signal traces 20 and the second signal traces 22, the interference between the driving signals and the sensing signals can be reduced. Furthermore, since the first signal traces 20 are used for transmitting the driving signals and the second signal traces 22 are used for transmitting the sensing signals, there is no problem of signal interference between any two adjacent first signal traces 20 and between any two adjacent second signal traces 22. Accordingly, the shielding trace 24 may not be disposed between two adjacent first signal traces 20, nor between two adjacent second signal traces 22. In one embodiment, the shielding trace 24 may be electrically connected to ground or be floated. When the shielding trace 24 is electrically connected to the ground, the shielding trace 24 may further be used for providing a discharging path of static charges on the first signal traces 20 and the second signal traces 22 so as to provide electrostatic discharge (ESD) protection for the touch device 14. Since the shielding trace 24 has the multi-layer structure, the resistance of the shielding trace 24 may be less than the resistances of the first signal traces 20 and the second signal traces 22, such that the static charges on the first signal traces 20 and the second signal traces 22 and the static charges around the shielding trace 24 may tend to be discharged through the shielding trace 24, thereby improving the anti-static ability of the touch panel 1.

In this embodiment, the shielding trace 24 may be a double-layer structure and includes a first trace layer L1 and a second trace layer L2, wherein the first trace layer L1 is disposed between the substrate 12 and the second trace layer L2, but not limited thereto. In the direction TD, the first trace layer L1 may at least partially overlap the second trace layer L2, so that the first trace layer L1 and the second trace layer L2 may be electrically connected to each other. In some embodiments, the second trace layer L2 may have the same extending length as the first trace layer L1 or completely cover the first trace layer L1, but not limited thereto. In the direction TD, the thickness T1 of the first trace layer L1 in this embodiment is less than the thickness T2 of the second trace layer L2. In other embodiments, the thickness T1 of the first trace layer L1 may be equal to the thickness T2 of the second trace layer L2. In the embodiment shown in FIG. 2, the cross-sectional shape of the second trace layer L2 may be, for example, a T shape that is a shape having a narrower bottom surface and a wider top surface. For example, the second trace layer L2 may include a top portion P1 located on the insulating layer IN1 and a bottom portion P2 penetrating through the insulating layer INL and the bottom portion P2 is located between the top portion P1 and the first trace layer L1. In a cross-sectional direction, a width W1 of the top portion P1 may be greater than a width W2 of the bottom portion P2. Further, the width W1 of the top portion P1 may be greater than or equal to the width W3 of the first trace layer L1, and the limit of the width W1 of the top portion P1 is that the projection of the top portion P1 on the top surface 12S along the direction TD doesn't overlap the first signal trace 20 and the second signal trace 22 of the conductive traces closest to the first trace layer L1. For example, the projection of the top portion P1 on the top surface 12S along the direction TD may have a portion beyond the first trace layer L1 and on a side of the first trace layer L1, and the width of the portion may be less than or equal to a half of a distance G between the first trace layer L1 and the first signal trace 20 or the second signal trace 22 of the conductive traces closest to the first trace layer L1, i.e. the width W1 of the top portion P1 may comply with the formula: $(W1-W3)/2 \leq G/2$.

In some embodiments, the first trace layer L1, the first signal traces 20 and the second signal traces 22 may include the same non-transparent conductive material, for example, being formed of the non-transparent conductive pattern layer NC. The non-transparent conductive material may be, for example, a metal material. The second trace layer L2, the first electrode pads 16E and the second electrode pads 18E may include the same transparent conductive material, for example being formed of the transparent conductive pattern layer TC. Through the second trace layer L2, the first signal traces 20 and the second signal traces 22 may be respectively capacitively coupled with the second trace layer L2 (as shown by arrow A1 in FIG. 2), thereby reducing the signal interference between the first signal traces 20 and the second signal traces 22. In some embodiments, the shielding trace 24 may be a multilayer structure and include multiple trace layers.

In some embodiments, the conductive traces may optionally further include an anti-static ring 28 for providing the touch panel 1 with a static discharging path. The anti-static ring 28 at least partially surrounds the touch device 14, the first signal traces 20 and the second signal traces 22, and the first signal traces 20 and the second signal traces 22 may be disposed between the touch device 14 and the anti-static ring 28. For example, as shown in FIG. 1, the anti-static ring 28 may include two anti-static lines 28L1, 28L2, and the first signal traces 20 and the second signal traces 22 may be respectively disposed between the anti-static line 28L1 and the touch device 14 and between the anti-static line 28L2 and the touch device 14. In such situation, the traces may further include a shielding trace 30 disposed between the anti-static line 28L2 and the second signal traces 22. In some embodiments, as shown in FIG. 2, the shielding trace 30 may have a structure similar to or the same as the shielding trace 24, for example, including the first trace layer L1 and the second trace layer L2, and accordingly will not be redundantly detailed. In addition, in the direction TD, the shielding trace 30 may not overlap the second signal traces 22 and the anti-static ring 28.

In some embodiments, the conductive traces may further include a plurality of third signal traces 32 respectively electrically connected to the other ends of the first electrode strings 16. For example, the third signal traces 32 may extend to a side of the touch device 14 opposite to the first signal traces 20 through a side of the touch device 14 opposite to the second signal traces 22. The third signal traces 32 and the first signal traces 20 may for example are respectively connected to the odd first electrode strings 16 and the even first electrode strings 16 counted from left to right of the first electrode strings 16, but not limited thereto, and they may be exchanged. Alternatively, one of the third signal traces 32 and a corresponding one of the first signal traces 20 may be electrically connected to the same first electrode string 16, but not limited thereto. In this case, the traces may further include a shielding trace 34 and a shielding trace 36, the shielding trace 34 is disposed between the first signal traces 20 and the third signal traces 32, and the shielding trace 36 is disposed between the third signal traces 32 and the anti-static line 28L1. In some embodiments, the shielding trace 34 and/or the shielding trace 36 may be similar to or the same as the shielding trace 24 and have the multilayer structure. In some embodiments, at least one of the shielding traces 24, 30, 34, 36 may have the multilayer structure, and others may be formed of the non-transparent conductive pattern layer NC. In some embodiments, the conductive traces may further include a plurality of fourth signal traces (not shown) respectively electrically connected to the other ends of the second electrode strings 18, and in such situation, the traces may further include a shielded trace (not shown) between the fourth signal traces and the first signal traces 20. In some embodiments, the traces may only include at least one of the shielding trace 24, 30, 34, 36 and doesn't include other shielding traces. For example, the traces may include only the shielding trace 24 disposed between the first signal traces 20 and the second signal traces 22 or the shielding trace 30 disposed between the second signal traces 22 and the anti-static line 28L2, but not limited thereto.

In this embodiment, the touch panel 1 may further include an insulating layer IN1 disposed between the non-transparent conductive pattern layer NC and the transparent conductive pattern layer TC and used for electrically insulating the first bridge electrode 16B from the second bridge electrode 18B. The insulating layer IN1 may have a plurality of openings OP1 exposing the first trace layer L1 and two parts of each of the first bridge electrodes 16B in the touch region 1T, so that the second trace layer L2 may be electrically connected to the first trace layer L1 through one of the openings OP1, and the first electrode pads 16E and the first bridge electrodes 16B may be electrically connected into the first electrode strings 16. The insulating layer IN1 may include silicon oxide, silicon nitride, or other suitable insulating materials. In some embodiments, the touch panel 1 may optionally include a protection layer PA disposed on the touch device 14 and the traces to protect them. The protection layer PA may include silicon oxide, silicon nitride, organic materials, or other suitable insulating materials. In some embodiments, the touch panel 1 may optionally include a cover plate 38 attached to the protection layer PA to be used as a film of the touch panel 1 where the user touches. The cover plate 38 may include, for example, a rigid substrate or a flexible substrate. The rigid substrate may for example include glass, or other suitable material, but not limited thereto. The flexible substrate may include, for example, polyimide (PI) or other suitable materials, but not limited thereto. When the shielding trace (e.g. the shielding trace 24) has the multi-layer structure, the distance between the cover plate 38 and the shielding trace 24 may be less than the distance between the cover plate 38 and the signal trace, and therefore the static charges accumulated at the surface of the cover plate 38 facing the substrate 12 may tend to be discharged by the shielding trace 24 (as shown by the arrow A2 of FIG. 2), thereby improving the anti-static ability of the touch panel 1. In some embodiments, the cover plate 38 may include a light-shielding layer for shielding the devices in the trace region 1N and define the touch region 1T, but not limited thereto.

Figure 3:
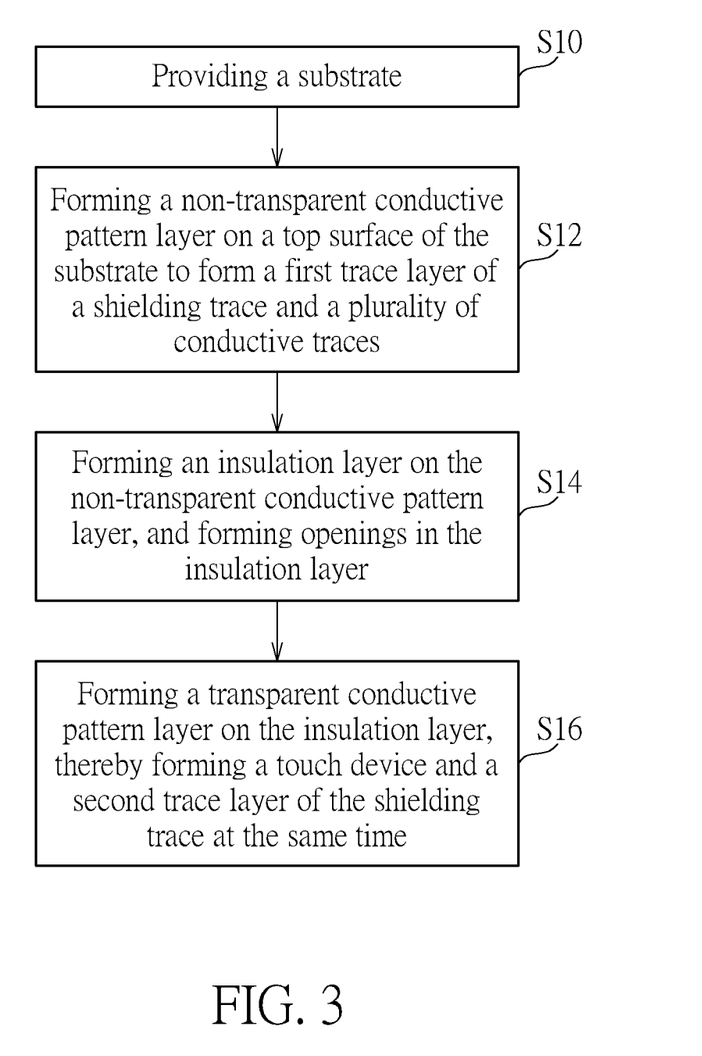
FIG. 3 is a flowchart of a method for manufacturing a touch panel according to an embodiment of the present invention.

The manufacturing method of the touch panel 1 will be further described below. Please refer to FIG. 3, which is a flowchart of a method for manufacturing a touch panel according to an embodiment of the present invention. As shown in FIG. 3, the manufacturing method of the touch panel may include steps S10, S12, S14, S16. The manufacturing method of FIG. 3 will be described below with reference to FIG. 1 and FIG. 2 of the first embodiment, but not limited thereto. In some embodiments, some steps may be added or deleted according to requirements. As shown in FIG. 1 to FIG. 3, in the step S10, the substrate 12 is firstly provided. Then, the touch device 14 is formed on the substrate 12 in the touch region 1T, and the shielding trace (e.g. the shielding trace 24) is formed on the substrate 12 in the trace region 1N. The first embodiment of FIG. 1 and FIG. 2 are taken as an example in the following description for mentioning the method of forming the touch device 14 and the shielding trace 24, but not limited thereto. In the step S12, the non-transparent conductive pattern layer NC is formed on the top surface 12S of the substrate 12 through a photolithography and etching process to form the first trace layer L1 of the shielding trace 24 and the conductive traces. The shielding trace 24 is disposed between two of the conductive traces. For example, the shielding trace 24 is disposed between the first signal trace 20 and the second signal trace 22. Later, in the step S14, the insulation layer IN1 is formed on the non-transparent conductive pattern layer NC, and the openings OP1 are formed in the insulation layer IN1. Following that, in the step S16, the transparent conductive pattern layer TC is formed on the insulation layer IN1 through another photolithography and etching process, thereby forming the touch device 14 and the second trace layer L2 of the shielding trace 24 at the same time. In some embodiments, the protection layer PA and the cover plate 28 may be sequentially formed on the touch device 14 and the traces. Since the first trace layer L1 of the shielding trace 24 and the first signal traces 20 may be formed of the same non-transparent conductive pattern layer NC and the second trace layer L2 and the first electrode pads 16E of the touch device 14 may be formed of the same transparent conductive pattern layer TC, such that the disposition of the shielding trace 24 doesn't increase the manufacturing step and the number of the used masks. In the manufacturing method of this embodiment, since the non-transparent conductive pattern layer NC is formed before forming the transparent conductive pattern layer TC, an alignment step may be performed through the non-transparent conductive pattern layer NC while forming the transparent conductive pattern layer TC, thereby increasing alignment accuracy between the transparent conductive pattern layer TC and the non-transparent conductive pattern layer NC.

The touch panel and the manufacturing method thereof of the present invention are not limited to the above embodiment and may include other embodiments or variant embodiments. In order to simplify the description and highlight the differences between the first embodiment and other embodiments between the first embodiment and variant embodiments, the elements of other embodiments and variant embodiments and the same element of the first embodiment will use the same reference numerals, and the repeated portion will not be redundantly described.

Figure 4:
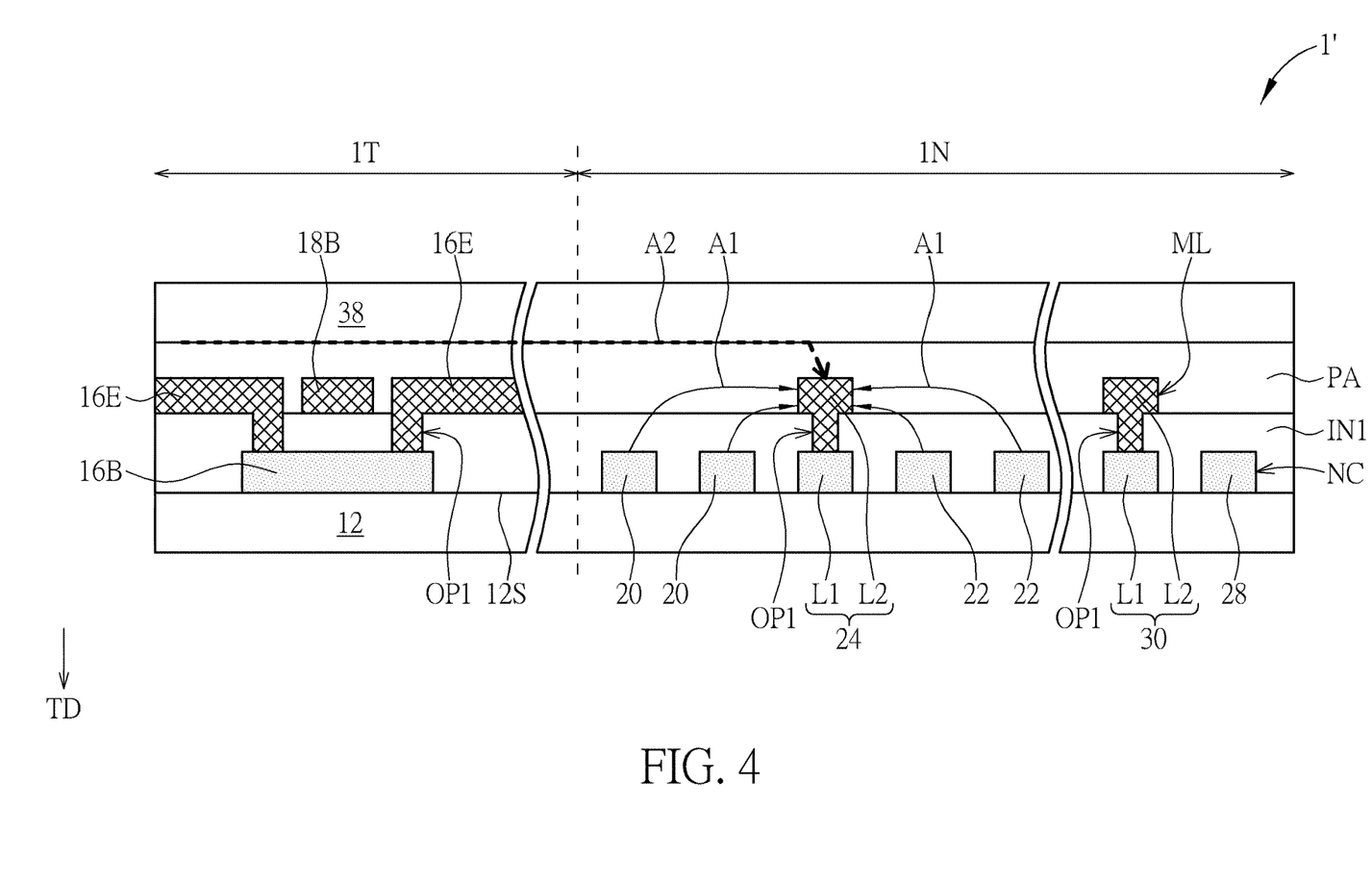
FIG. 4 schematically illustrates a cross-sectional view of a touch panel according to a variant embodiment of the first embodiment of the invention embodiment.

Please refer to FIG. 4, which schematically illustrates a cross-sectional view of a touch panel according to a variant embodiment of the first embodiment of the invention embodiment. The difference between the touch panel 1' of this variant embodiment and the above embodiment shown in FIG. 2 is that in this embodiment, the metal mesh layer ML may replace the transparent conductive pattern layer TC of the above embodiment. Specifically, the first electrode pads 16E, the second electrode pads 18E, the second bridge electrodes 18B and the second trace layer L2 of the shielding trace 24 may be formed of the same metal mesh layer ML. Since the metal mesh layer ML has a mesh shape and the widths of the mesh lines are small enough to be hardly noticed by human eyes, the metal mesh layer ML may not affect the images displayed by the combined display device. The metal mesh layer ML may include a metal material, such as silver or nano silver. In some embodiments, the non-transparent conductive pattern layer NC may be a metal mesh layer.

Figure 5:
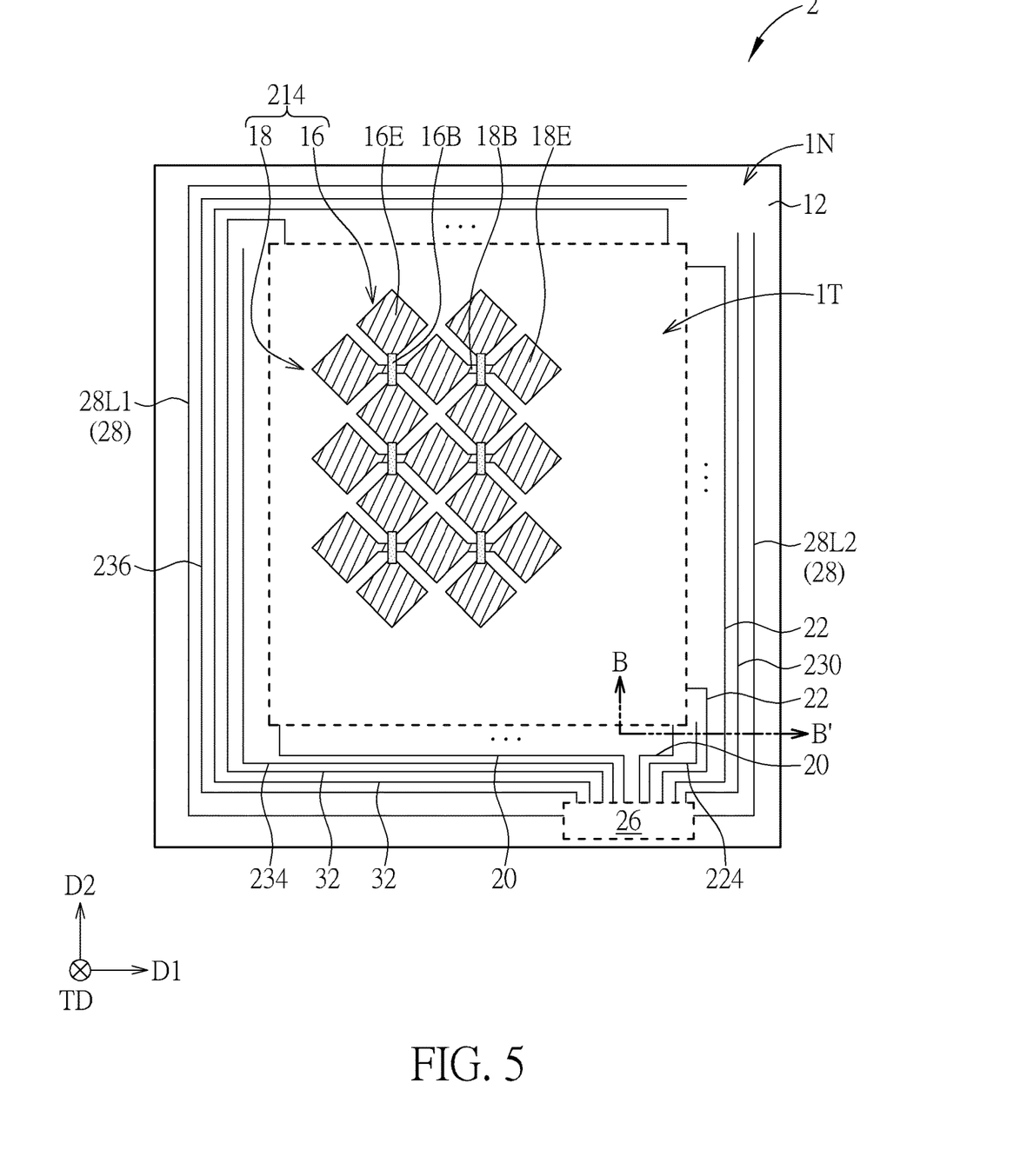
FIG. 5 schematically illustrates a top view of a touch panel according to a second embodiment of the present invention.
Figure 6:
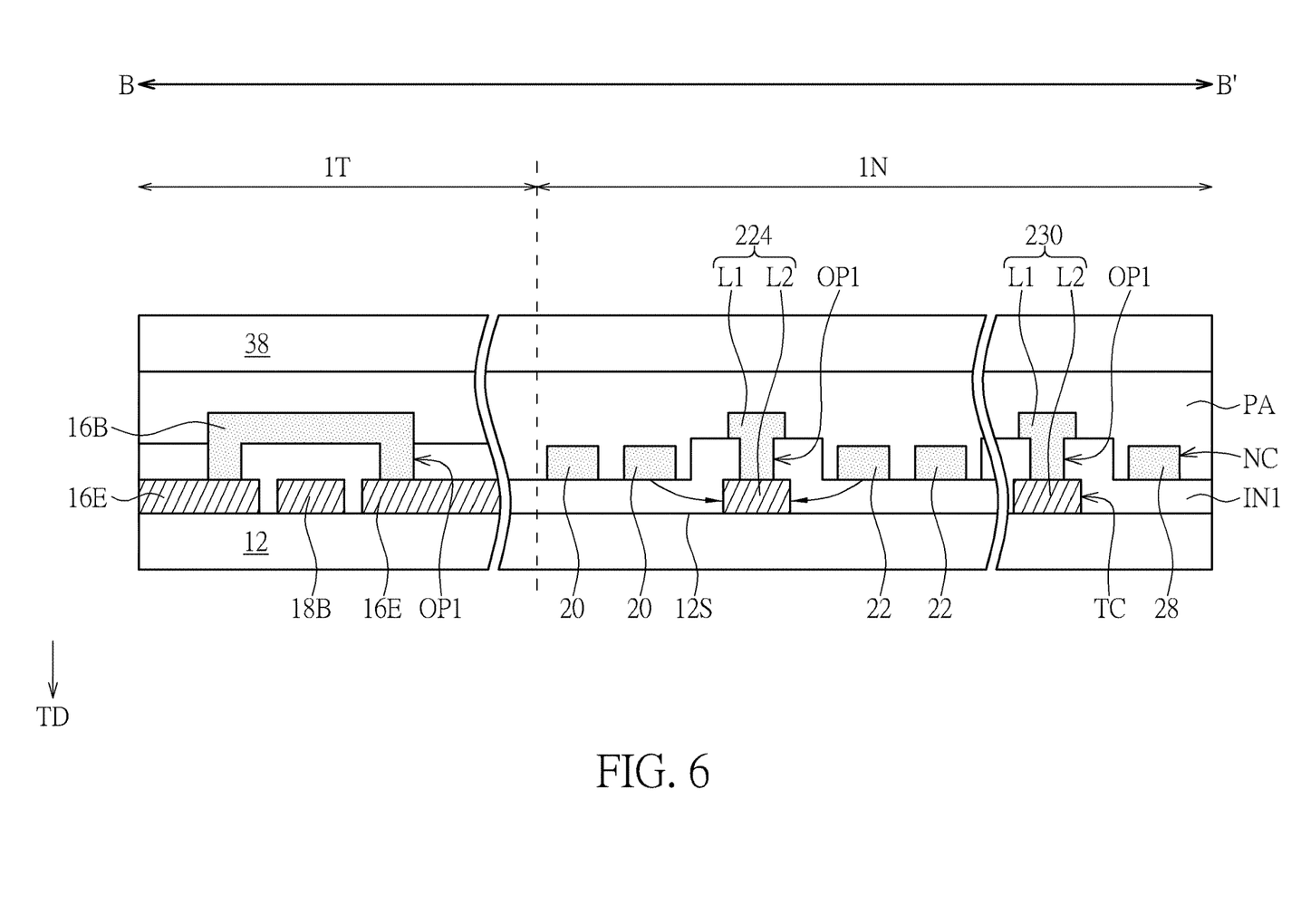
FIG. 6 schematically illustrates a cross-sectional view taken along a line B-B' of FIG. 5.

Please refer to FIG. 5 and FIG. 6. FIG. 5 schematically illustrates a top view of a touch panel according to a second embodiment of the present invention. FIG. 6 schematically illustrates a cross-sectional view taken along a line B-B' of FIG. 5. The difference between the touch panel 2 of this embodiment and the above embodiment is that the transparent conductive pattern layer TC of this embodiment is formed on the substrate 12 before forming the non-transparent conductive pattern layer NC. Specifically, in the manufacturing method of the touch panel 2 of this embodiment, the transparent conductive pattern layer TC including the first electrode pads 16E, the second electrode pads 18E and the second bridge electrodes 18B is firstly formed on the substrate 12, and then, the insulating layer IN1 having the openings OP1 is formed on the transparent conductive pattern layer TC. Next, the non-transparent conductive pattern layer NC including the first bridge electrodes 16B and signal traces is formed on the insulating layer IN1, thereby forming the touch device 214 and the shielding traces 224, 230, 234, 236. In the touch panel 2 of this embodiment, the second trace layer L2 of the shielding trace 224 formed of the transparent conductive pattern layer TC may be disposed between the substrate 12 and the first trace layer L1 formed of the non-transparent conductive pattern layer NC. Moreover, the second bridge electrodes 18B may be disposed between the first bridge electrodes 16B and the substrate 12, but not limited thereto. In some embodiments, at least one of the shielding traces 224, 230, 234, 236 may have the multilayer structure and include the first trace layer L1 and the second trace layer L2. In some embodiments, the second trace layer L2 of at least one of the shielding traces 224, 230, 234, 236 may be similar to or the same as the second trace layer L2 of the first embodiment, and the width relationship between the second trace layer L2 and the first trace layer L1 may be similar to or the same as the width relationship between the second trace layer L2 and the first trace layer L1 of the first embodiment and therefore will not be repeated herein. In some embodiments, the transparent conductive pattern layer TC including the first electrode pads 16E, the second electrode pads 18E, the second bridge electrodes 18B, and the second trace layer L2 of the shielding trace 224 may be replaced with the metal mesh layer. In some embodiments, the non-transparent conductive pattern layer NC may be the metal mesh layer.

Figure 7:
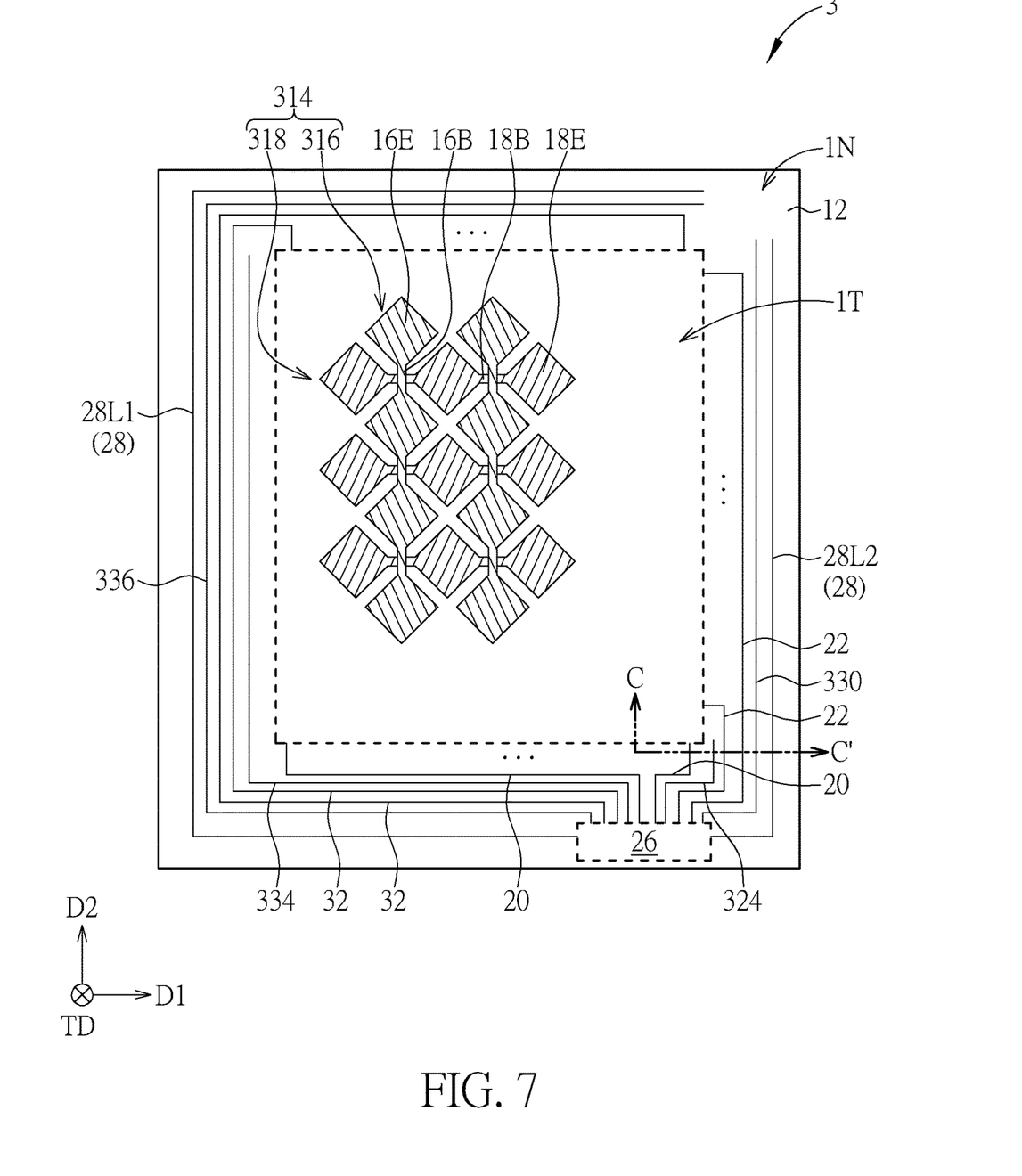
FIG. 7 schematically illustrates a top view of a touch panel according to a third embodiment of the present invention.
Figure 8:
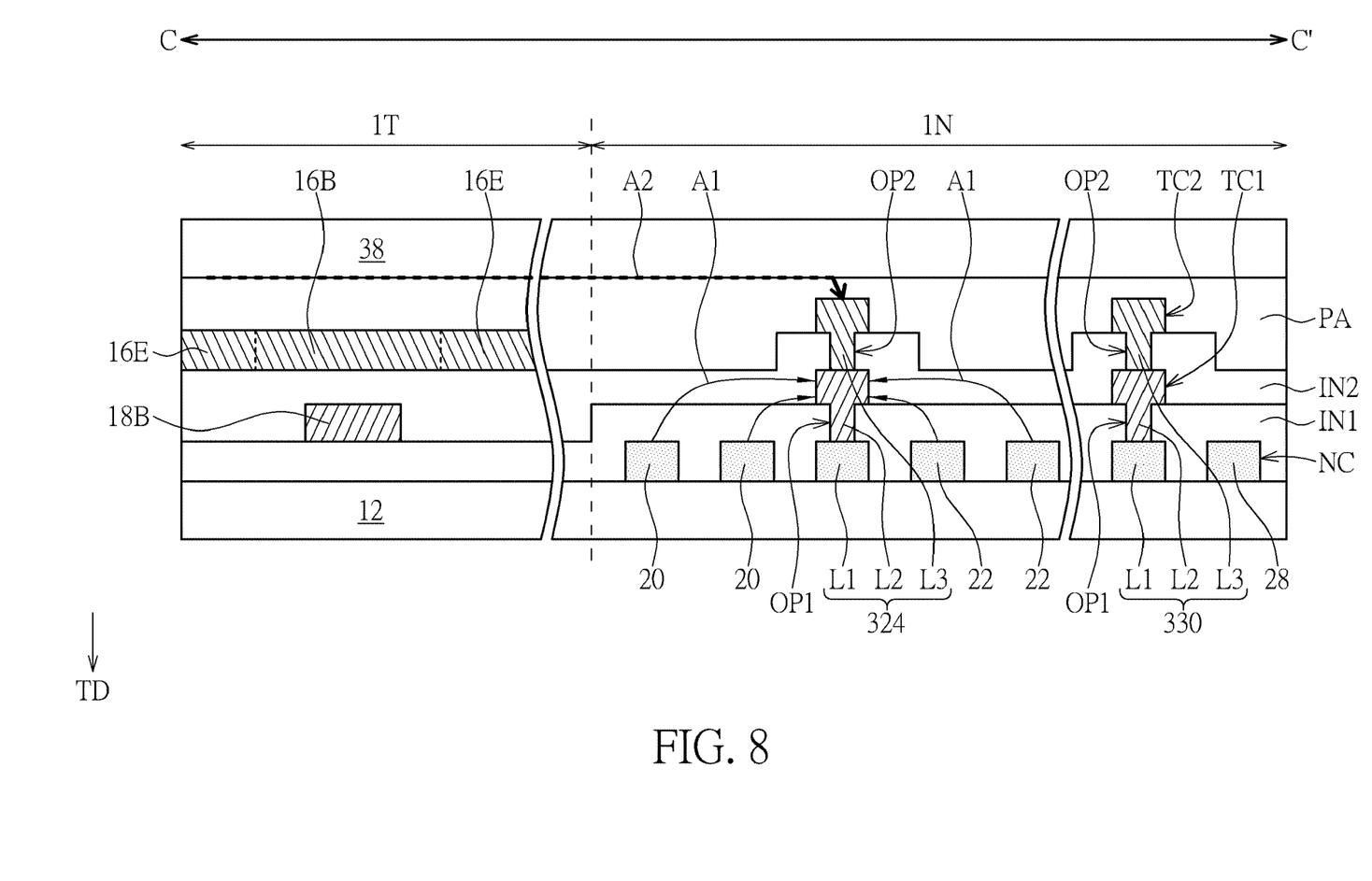
FIG. 8 schematically illustrates a cross-sectional view taken along a line C-C' of FIG. 7.

Please refer to FIGS. 7 and 8. FIG. 7 schematically illustrates a top view of a touch panel according to a third embodiment of the present invention. FIG. 8 schematically illustrates a cross-sectional view taken along a line C-C' of FIG. 7. The difference between the touch panel 3 of this embodiment and the first embodiment of FIG. 1 and FIG. 2 is that the touch device 314 of this embodiment may be formed of two transparent conductive pattern layer TC1, TC2 and the insulating layer IN2. Specifically, in the manufacturing method of the touch panel 3 of this embodiment, the non-transparent conductive pattern layer NC including the signal traces is firstly formed, and then the insulating layer IN1 having the openings OP1 is formed on the non-transparent conductive pattern layer NC. Thereafter, the transparent conductive pattern layer TC1 is formed on the insulating layer IN1, and the insulating layer IN2 having the openings OP2 is formed on the transparent conductive pattern layer TC1. Then, the transparent conductive pattern layer TC2 is formed on the insulating layer IN2, thereby forming the touch device 314 and the shielding traces 324, 330, 334, 336. In this embodiment, the second electrode strings 318 formed by connecting the second electrode pads 18E and the second bridge electrodes 18B may be formed of the transparent conductive pattern layer TC1, and the first electrode strings 316 formed by connecting the first electrode pads 16E and the first bridge electrodes 16B may be formed of the transparent conductive pattern layer TC2, but not limited thereto. In some embodiments, the first electrode strings 316 and the second electrode strings 318 may be formed of the transparent conductive pattern layer TC1 and the transparent conductive pattern layer TC2, respectively. It is noted that the shielding traces 324, 330, 334, 336 of this embodiment may have a three-layer structure and include the first trace layer L1, the second trace layer L2, and a third trace layer L3. The first trace layer L1 may be formed of the non-transparent conductive pattern layer NC, the second trace layer L2 may be formed of the transparent conductive pattern layer TC1 and is electrically connected to the first trace layer L1 through the opening OP1, and the third trace layer L3 may be formed of the transparent conductive pattern layer TC2 and electrically connected to the second trace layer L2 through the opening OP2. In some embodiments, at least one of the shielding traces 324, 330, 334, 336 may have the multi-layer structure, and the others may be formed of the non-transparent conductive pattern layer NC. In some embodiments, the second trace layer L2 and/or the third trace layer L3 of at least one of the shielding traces 324, 330, 334, 336 may be similar to or the same as the second trace layer L2 of the first embodiment, and the width relationship between the second trace layer L2 and/or the third trace layer L3 and the first trace layer L1 may also be similar or the same as the width relationship between the second trace layer L2 and the first trace layer L1 of the first embodiment, so they will not be repeatedly detailed. In some embodiments, the transparent conductive pattern layer TC1 including the second electrode pads 18E, the second bridge electrodes 18B and the second trace layer L2 of the shielding trace may be replaced with the metal mesh layer. In some embodiments, the transparent conductive pattern layer TC2 including the first electrode pads 16E, the first bridge electrodes 16B, and the third trace layer L3 of the shielding trace may be replaced with the metal mesh layer.

As mentioned above, in the touch panel of the present invention, since the shielding trace is the multilayer structure, the capacitive coupling doesn't easily penetrate through the shielding trace to be generated between the conductive traces (e.g. signal traces), thereby reducing the signal interference between the conductive traces. Also, since the shielding trace has the multilayer structure, the resistance of the shielding trace may be less than the resistances of the conductive traces, so that the static charges on the conductive traces or the cover plate may be preferentially discharged through the shielding trace, thereby improving the anti-static ability of the touch panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A touch panel having a touch region and a trace region disposed at least on one side of the touch region, comprising:
a substrate;
a touch device disposed on a top surface of the substrate in the touch region, and the touch device comprising a plurality of electrode pads;
a first shielding trace disposed on the top surface of the substrate in the trace region and insulated from the touch device, wherein the first shielding trace comprises a first trace layer and a second trace layer electrically connected to each other, and in a direction perpendicular to the top surface of the substrate, the first trace layer at least partially overlaps the second trace layer; and
a plurality of conductive traces disposed on the top surface of the substrate in the trace region, and at least a part of the conductive traces is electrically connected to the touch device, wherein the first shielding trace is disposed between two of the conductive traces, and in the direction, the first shielding trace doesn't overlap the conductive traces, wherein the first trace layer is disposed between the substrate and the second trace layer, a thickness of the first trace layer is less than a thickness of the second trace layer, the second trace layer comprises a top portion and a bottom portion, the bottom portion is disposed between the top portion and the first trace layer, a width of the top portion is greater than a width of the bottom portion, and the width of the top portion is greater than or equal to a width of the first trace layer, and wherein the width of the top portion complies with a formula: $(W1-W3)/2 \leq G/2$, where W1 is the width of the top portion, W3 is the width of the first trace layer, and G is a distance between the first trace layer and one of the conductive traces closest to the first trace layer.

2. A touch panel having a touch region and a trace region at least disposed on a side of the touch region, comprising:
a substrate;
a touch device disposed on a top surface of the substrate in the touch region, and the touch device comprising a plurality of electrode pads; and
a first shielding trace disposed on the top surface of the substrate in the trace region and insulated from the touch device, wherein the first shielding trace comprises a first trace layer and a second trace layer electrically connected to each other, in a direction perpendicular to the top surface of the substrate, the first trace layer at least partially overlaps the second trace layer, and the second trace layer and the electrode pads are formed of a transparent conductive pattern layer, wherein the first trace layer is disposed between the substrate and the second trace layer, a thickness of the first trace layer is less than a thickness of the second trace layer, the second trace layer comprises a top portion and a bottom portion, the bottom portion is disposed between the top portion and the first trace layer, a width of the top portion is greater than a width of the bottom portion, and the width of the top portion is greater than or equal to a width of the first trace layer, and wherein the width of the top portion complies with a formula: $(W1-W3)/2 \leq G/2$, where W1 is the width of the top portion, W3 is the width of the first trace layer, and G is a distance between the first trace layer and one of the conductive traces closest to the first trace layer.

3. The touch panel according to claim 2, further comprising a plurality of first signal traces and a plurality of second signal traces disposed on the top surface of the substrate in the trace region, wherein the first signal traces, the second signal traces and the first trace layer are formed of a same non-transparent conductive pattern layer.

4. A manufacturing method of a touch panel, comprising:
providing a substrate; and
forming a touch device on the substrate in a touch region and forming a shielding trace and a plurality of conductive traces on the substrate in a trace region, wherein the shielding trace is disposed between two of the conductive traces,
wherein the touch device is insulated from the shielding trace and comprises a plurality of electrode pads, at least a part of the conductive traces is electrically connected to the touch device, and the shielding trace comprises a first trace layer and a second trace layer electrically connected to each other, wherein in a direction perpendicular to a top surface of the substrate, the first trace layer at least partially overlaps the second trace layer, and the shielding trace doesn't overlap the conductive traces, wherein the first trace layer is disposed between the substrate and the second trace layer, a thickness of the first trace layer is less than a thickness of the second trace layer, the second trace layer comprises a top portion and a bottom portion, the bottom portion is disposed between the top portion and the first trace layer, a width of the top portion is greater than a width of the bottom portion, and the width of the top portion is greater than or equal to a width of the first trace layer, and wherein the width of the top portion complies with a formula: $(W1-W3)/2 \leq G/2$, where W1 is the width of the top portion, W3 is the width of the first trace layer, and G is a distance between the first trace layer and one of the conductive traces closest to the first trace layer.

5. The manufacturing method of the touch panel according to claim 4, wherein the conductive traces and the first trace layer are formed of a same non-transparent conductive pattern layer.

6. The touch panel according to claim 1, further comprising an insulating layer having an opening, wherein a part of the insulating layer being disposed between the first trace layer and the second trace layer, and the second trace layer being electrically connected to the first trace layer through the opening.

7. The touch panel according to claim 2, further comprising an insulating layer having an opening, wherein a part of the insulating layer being disposed between the first trace layer and the second trace layer, and the second trace layer being electrically connected to the first trace layer through the opening.

8. The touch panel according to claim 1, wherein the second trace layer and the electrode pads are formed of a transparent conductive pattern layer, the transparent conductive pattern layer comprises a transparent conductive material, and the conductive traces and the first trace layer comprise a non-transparent conductive material different from the transparent conductive material.

9. The touch panel according to claim 1, wherein the conductive traces comprise a plurality of first signal traces and a plurality of second signal traces disposed on the substrate in the trace region and electrically connected to the touch device, and the two of the conductive traces are respectively one of the first signal traces and one of the second signal traces.

10. The touch panel according to claim 9, wherein the first signal traces are used for transmitting driving signals, and the second signal traces are used for transmitting sensing signals.

11. The touch panel according to claim 9, wherein the electrode pads comprise a plurality of first electrode pads and a plurality of second electrode pads on the top surface of the substrate, the touch device further comprises a plurality of first bridge electrodes and a plurality of second bridge electrodes, the first electrode pads and the first bridge electrodes form a plurality of first electrode strings, the first electrode strings are used for transmitting driving signals, the second electrode pads and the second bridge electrodes form a plurality of second electrode strings, the second electrode strings are used for transmitting sensing signals, the first electrode strings cross the second electrode strings, the first signal traces are electrically connected to the first electrode strings respectively, and the second signal traces are electrically connected to the second electrode strings respectively.

12. The touch panel according to claim 9, wherein the first signal traces, the second signal traces and the first trace layer are formed of a same non-transparent conductive pattern layer.

13. The touch panel according to claim 9, further comprising a second shielding trace, the conductive traces comprising an anti-static ring disposed on the top surface of the substrate in the trace region, the second shielding trace is disposed between the anti-static ring and the first signal traces or between the anti-static ring and the second signal traces, and the first signal traces and the second signal traces are disposed between the touch device and the anti-static ring.

14. The touch panel according to claim 1, wherein the conductive traces comprise a plurality of first signal traces, a plurality of second signal traces and an anti-static ring, the anti-static ring at least partially surrounds the touch device, the first signal traces and the second signal traces, one of the two of the conductive traces is the anti-static ring, and another one of the two of the conductive traces is one of the first signal traces or one of the second signal traces.

* * * * *